United States Patent [19]
Nii et al.

[11] Patent Number: 5,541,462
[45] Date of Patent: Jul. 30, 1996

[54] ROTARY BODY BEARING APPARATUS, MOTOR AND POLYGON MIRROR MOTOR

[75] Inventors: Katsutoshi Nii; Ichiro Hashimoto; Takeshi Nakajima; Sueo Akashi, all of Hitachi, Japan

[73] Assignee: Hitachi, Ltd., Tokyo, Japan

[21] Appl. No.: 233,757

[22] Filed: Apr. 26, 1994

[30] Foreign Application Priority Data

Apr. 27, 1993 [JP] Japan ..................... 5-100709

[51] Int. Cl.⁶ .............. H02K 7/08; H02K 7/09; F16C 32/06
[52] U.S. Cl. .............. 310/90; 310/905; 384/114
[58] Field of Search .................. 310/67 R, 90, 310/90.5; 384/100, 114, 118, 322, 415

[56] References Cited

U.S. PATENT DOCUMENTS

| 4,416,555 | 11/1983 | Tomioka et al. | 384/415 |
|---|---|---|---|
| 4,694,213 | 9/1987 | Gowda et al. | 310/90 |
| 4,938,611 | 7/1990 | Nii et al. | 384/133 |
| 5,108,198 | 4/1992 | Nii et al. | 384/133 |
| 5,325,006 | 6/1994 | Uno et al. | 310/90 |
| 5,417,507 | 5/1995 | Uno et al. | 384/133 |

FOREIGN PATENT DOCUMENTS

| 61-2915 | 1/1986 | Japan | 310/90.5 |
|---|---|---|---|
| WO8703347 | 6/1987 | WIPO | 310/90.5 |

*Primary Examiner*—Clayton E. Laballe
*Attorney, Agent, or Firm*—Antonelli, Terry, Stout & Kraus

[57] ABSTRACT

A rotary body bearing apparatus has a bearing supporting member, a radial bearing member, a bearing chamber formed in the bearing supporting member for holding the radial bearing member, a rotative shaft supported rotatively by the radial bearing member, and lubricating oil filling a bearing clearance between the rotative shaft and the radial bearing member. An air bubble restraint means restrains the occurrence of air bubbles generated in the lubricating oil by the rotation of the rotative shaft. Even when the rotative shaft rotates at the high speed of rotation, by the provision of the air bubble occurrence restraint means, the occurrence of air bubbles generated in the lubricating oil can be restrained, high accuracy rotation can be maintained and a rotation number fluctuation of the rotary body can be reduced.

17 Claims, 2 Drawing Sheets

ROTARY BODY BEARING APPARATUS, MOTOR AND POLYGON MIRROR MOTOR

BACKGROUND OF THE INVENTION

The present invention relates to a rotary body bearing apparatus and a motor required to operate with extreme rotation accuracy, such as a polygon mirror motor for use in a laser beam printer and, more particular, to a rotary body bearing apparatus having a bearing structure capable of high accuracy in rotation and a motor, such as a polygon mirror motor, having an extremely small rotation fluctuation.

Recently, in a laser beam printer, a magnetic disc apparatus and a video tape recorder, accompanying the high performance and the high function of a motor for used in these apparatuses it requires the high rotation accuracy for the motor.

In a conventional technique, a ball bearing structure is used in this kind of motor, however, for the purpose of providing a high speed characteristic and a low rotation number fluctuation characteristic, a fluid lubrication bearing structure has been adopted in the motor.

Further, from the point of view of maintaining a clean environment, an air bearing structure and a magnetic fluid bearing structure having a superior seal characteristic have been proposed and, at the present time, the air bearing structure and the magnetic fluid bearing structure have been put into practical use.

In particular, in comparison with the air bearing structure, since the magnetic fluid in a magnetic fluid bearing structure has a high viscosity, it is possible to obtain a high bearing rigidity characteristic with a bearing structure having a small inner diameter dimension and, further, to obtain a good attenuation characteristic with respect to the shaft vibration.

As an acceptable bearing apparatus for the high accuracy rotation, such a technique is disclosed in, for example, Japanese patent laid-open No. 512,514/1991.

According to the above stated prior technique, it has been proposed to use a fluid bearing structure having a high speed characteristic and a high accuracy rotation characteristic for a motor, and further, in order to be able to use the motor in a clean environment the magnetic fluid is employed in the lubrication and sealing of the bearing structure.

However, although a motor using the above disclosed bearing apparatus provides a high accuracy of rotation, there is a limit to which the rotation number fluctuation can be reduced. As a result, there is a case in which such a motor can not be used in the recent models of laser beam printers having a high precision characteristic.

Namely, in the recent laser beam printers, by the electrical control of a polygon mirror motor which is used for effecting uniform speed scanning for the laser light, the rotation speed can be made constant.

The prior laser beam printer has a rotation number fluctuation of 10/1000%–20/1000%, however, in the laser beam printer providing a high precision characteristic and color characteristic, it is necessary to provide a high precision rotation accuracy with a rotation number fluctuation of less than 5/1000%.

In order to realize the above stated high rotation accuracy for the motor it is necessary to lessen the friction fluctuation of the bearing apparatus.

In a fluid bearing apparatus principally using lubricating oil and in which the viscosity of the fluid is constant, the bearing apparatus has no friction fluctuation, however, in the above stated prior bearing apparatus, it was found that it is difficult to realize a rotation number fluctuation which is less than 5/1000%.

Namely, in a high speed rotation region where the speed is more than 10,000 rpm, as a result of an analysis resulting from experimentation by the inventors of the present invention, it was found that the higher the speed of rotation becomes, the larger the rotation number fluctuation becomes. In particular, at a high speed of rotation of more than 20,000 rpm, there is a case in which the rotation number changes irregularly.

So as to more clearly understand the above phenomena and so as to solve the above problems, using a transparent bearing case, the flow of the lubricating oil in a bearing chamber was observed by the inventors of the present invention. As a result, it was found that the conditions of the surrounding portion of the bearing member and of the portion between both bearing members are varied in proportion to the high speed rotation.

Namely, due to the rotation of the rotative shaft, small air bubbles are generated in the lubricating oil, and as the air bubbles grow comparatively large bubbles are generated. Then, as the air bubbles grow to some large degree, large air bubbles are crushed to form fine bubbles. The above stated phenomena has been observed to occur repeatedly in the bearing chamber.

The above stated friction fluctuation of the fluid bearing is caused by the mixing of the air bubbles, however it is difficult to find an example in which a lubricating oil bearing is used in a polygon mirror motor, and at the same time there is no rotary machinery which requires such high accuracy of rotation.

Consequently, heretofore no consideration has been given to the reduction of the air bubbles and the prevention of the occurrence of the air bubbles being generated in the lubricating oil or the magnetic fluid during high speed rotation.

SUMMARY OF THE INVENTION

In view of the defects of the above stated prior techniques, the prevent invention has been devised so as to solve the problems of the prior art technique, and an object of the present invention is to provide a rotary body bearing apparatus, a precision rotation motor which can maintain high accuracy rotation into the high speed rotation region, a polygon mirror motor, a magnetic disc drive motor, a video tape recorder cylinder motor and a bearing apparatus therefor.

In accordance with the present invention, a rotary body bearing apparatus comprises a bearing supporting member, a radial bearing member, a bearing chamber formed in the bearing supporting member for holding the radial bearing member, a rotative shaft supported rotatively by the radial bearing member, lubricating oil for immersing a bearing clearance between the rotative shaft and the radial bearing member, and an air bubble restraint means for restraining the occurrence of air bubbles generated in the lubricating oil by the rotation of the rotative shaft.

According to the present invention, even when the rotative shaft rotates at a high speed rotation, by the provision of the air bubble occurrence restraint means, since the occurrence of the air bubbles generated in the lubricating oil can be restrained, a high accuracy rotation can be maintained.

DETAILED DESCRIPTION OF THE INVENTION

Figure 1:
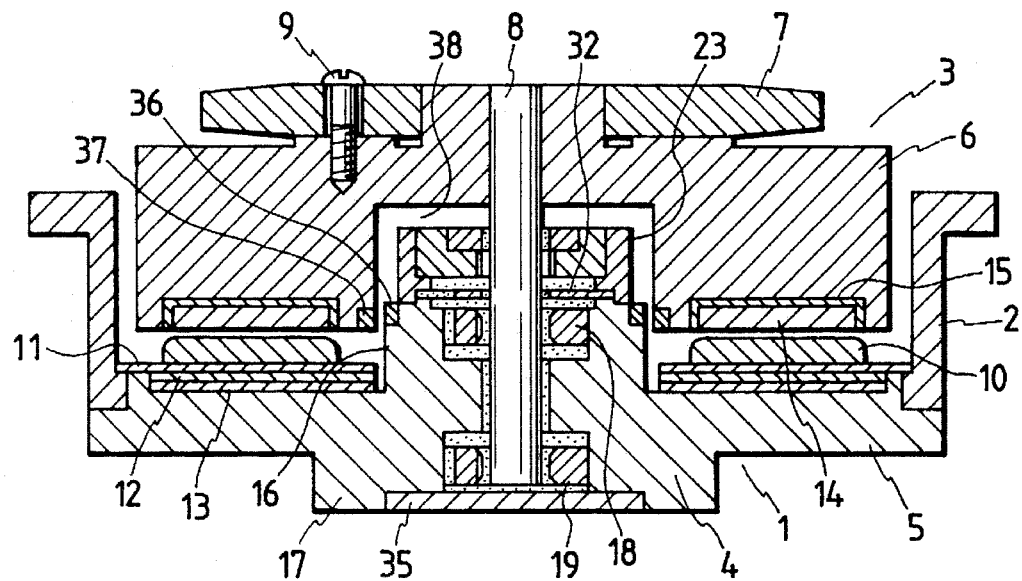
FIG. 1 is a longitudinal cross-sectional view of one embodiment of a polygon mirror motor according to the present invention.

Hereinafter, one embodiment according to the present invention will be explained with reference to the drawings.

The motor shown in the drawings, as an example of the present invention, is a polygon mirror motor having a polygon mirror and this polygon mirror motor of the type which is utilized in a laser beam printer.

As shown in FIG. 1, the polygon mirror motor comprises mainly a motor base body 1, a housing 2 and a rotary body 3 having a polygon mirror 7.

The motor base body 1 comprises a bearing supporting member 4 and a flange portion 5. The bearing supporting member 4 is formed of an aluminum material and is provided at a central portion of the motor base body 1. The flange portion 5 is formed at an outer periphery of the bearing supporting member 4.

This flange portion 5 operates as a supporting portion for a stator coil 10 which is described in a latter portion of this specification. The housing 2 is installed by fitting it into a groove in the outer periphery of the flange portion 5.

The rotary body 3 comprises a rotor (rotary stand or rotor supporting member) 6, the polygon mirror 7 and a rotative shaft 8. The rotor 6 is formed of an aluminum material, the polygon mirror 7 is mounted on the rotor 6 and the rotative shaft 8 is inserted and fixed to a central portion of the rotor 6.

The polygon mirror 7 is made of an aluminum material. The rotative shaft 8 is made of a stainless steel and has a sufficient permeability. The polygon mirror 7 is mounted on the rotor 6 by screws 9. The rotary body 3 is supported rotatively with respect to the motor base body 1. This rotation supporting structure will be explained later in detail.

In the flange portion 5 of the motor base body 1, the stator coil 10 is provided so as to face a lower face of the rotor 6. This stator coil 10 is installed on the flange portion 5 through a substrate body 11, an insulating layer 12 and a stator yoke plate 13. The stator coil 10 forms a flat shaped flat coil structure.

In the rotor 6, a rotor magnet 14 of the motor is mounted so as to face the stator coil 10. This rotor magnet 14 has a flat ring shaped form and is installed on the rotor 6 through a rotor yoke plate 15. The rotor magnet 14 and the stator coil 10 have a structural arrangement in which the rotor magnet 14 and the stator coil 10 face in the axial direction of the rotative shaft 8.

Figure 2:
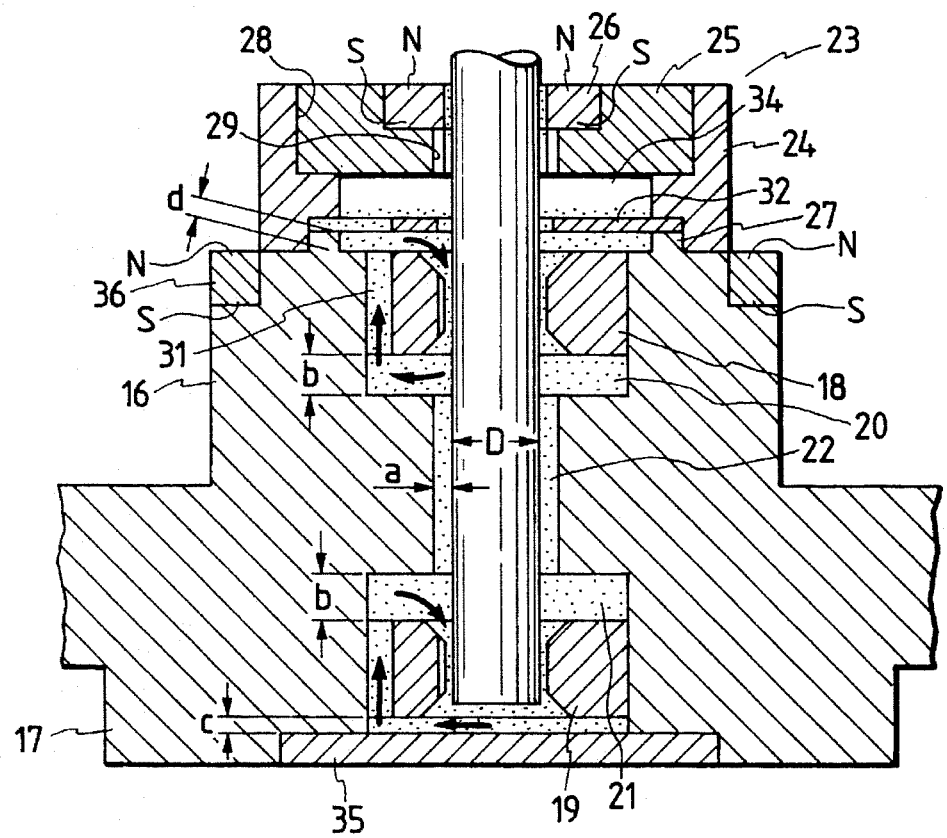
FIG. 2 is a longitudinal enlarged cross-sectional view of a bearing apparatus of the polygon mirror motor shown in FIG. 1.

The bearing supporting member 4 of the motor base body 1, as shown in FIG. 2, has an inner side bearing supporting portion 16 extending longitudinally toward the rotor 6 and an outer side bearing supporting portion 17 extending toward an outer side of the motor base body 1.

Figure 3:
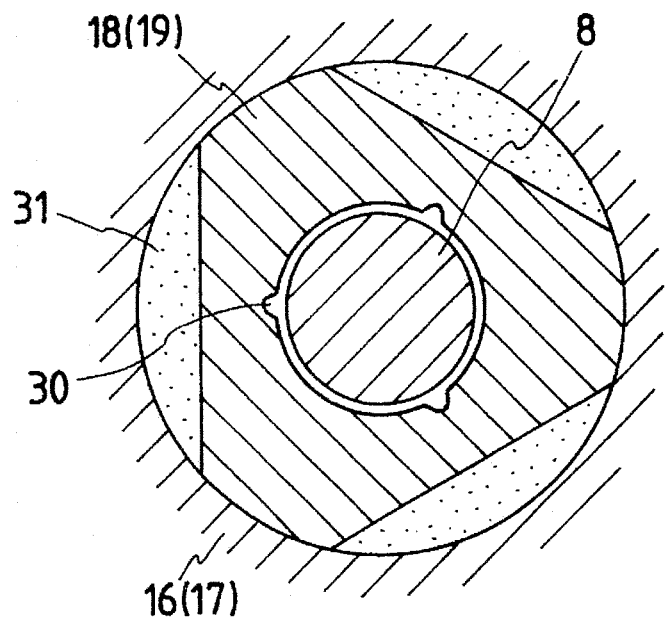
FIG. 3 is a lateral cross-sectional view of an outer side radial bearing of the polygon mirror motor shown in FIG. 1.

A substantially triangular shaped inner side radial bearing 18 is provided at an inner side of the inner side bearing supporting portion 16 and a substantially triangular shaped outer side radial bearing 19 is provided at an inner side of the outer side bearing supporting portion 17, as shown in FIG. 3, respectively.

An inner side bearing chamber 20 for holding the inner side radial bearing 18 is provided on the inner side bearing supporting portion 16. An outer side bearing chamber 21 for holding the outer side radial bearing 19 is provided on the outer side bearing supporting portion 17.

The inner side bearing chamber 20 and the outer side bearing chamber 21 are in communication with each other via a fluid communicating passage 22 for the bearing structure. This bearing fluid communicating passage 22 is formed in the bearing supporting member 4.

A cap 23 is provided on a tip end side of the inner side bearing supporting portion 16. The cap 23 comprises a cap base body 24, a screw type viscous seal 25 having a dynamic sealing function, and a magnetic seal 26 for sealing the magnetic fluid.

The cap base body 24 is made of an aluminum material and has a cylindrical shaped form. In a tip end side of the inner bearing supporting portion 16, a fitting projecting member 27 is provided concentrically with the inner side bearing chamber 20. Further, a ring shaped step portion for fitting into this fitting projecting member 27 is installed on the cap base body 24.

The cap base body 24 is installed by fitting the step portion into the fitting projecting member 27. The fitting between the fitting projecting member 27 and the step portion is carried out by sealing fully to a joining face to provide an air-tight condition.

An inner periphery of the cap base body 24 is formed to have the same face of an inner periphery of the fitting projecting member 27. An inner diameter of the fitting projecting member 27 is formed to be larger than the inner diameter of the inner side bearing supporting portion 16.

The screw type viscous seal 25 has a ring shaped form. This screw type viscous seal 25 is installed in the cap base body 24 by fitting the outer periphery thereof into a fitting step portion 28 which is formed on the cap base body 24. The fitting between the cap base body 24 and the fitting step portion 28 is carried out by sealing it fully to a joining face to provide an air-tight condition.

A spiral shaded groove 29 for recovering the magnetic fluid is formed in the inner periphery of the screw type viscous seal 25. This spiral shaped groove 29 faces the outer periphery of the rotative shaft 8 through a clearance. The spiral shaped groove 29 is formed to proceed toward a side of the inner side radial bearing 18 in compliance with a rotation direction of the rotative shaft 8.

A magnetic seal 26 for sealing the magnetic fluid is provided on the screw type viscous seal 25 and is composed by mixing ferrite particles with plastics. This magnetic seal 26 for sealing the magnetic fluid has a ring shaped form and surrounds completely the outer periphery of the rotative shaft 8. The magnetic seal 26 for sealing the magnetic fluid is installed by fitting the outer periphery thereof into the ring shaped step portion which is formed on the screw type viscous seal 25.

The fitting between the magnetic seal 26 for sealing the magnetic fluid and the step portion is carried out by sealing it fully to a joining face to provide an air-tight condition. The magnetic seal 26 for sealing the magnetic fluid forms a magnetic passage through the permeable rotative shaft 8 and due to the magnetic force of the magnetic passage, the sealing of the magnetic fluid is carried out.

The inner side radial bearing 18 is installed in the inner side bearing chamber 20 and is placed so as to align with an end face of the tip end side of the inner side bearing supporting portion 16.

Oil supply grooves 30 are formed in an inner peripheral face of the inner side radial bearing 18 as shown in FIG. 3. These oil supply grooves 30 are formed along an axial direction of the rotative shaft 8 and extend the full length of the inner side radial bearing 18. Three oil supply grooves 30 are arranged with an equal pitch, respectively.

Passages 31 are provided on the outer periphery of the inner side radial bearing 18. These passages 31 are formed at the straight shaped outer periphery of the inner side radial bearing 18. Three passages 31 are arranged respectively with an equal pitch.

Further, the passages 31 are provided on the outer periphery of the outer side radial bearing 19. These passages 31 are formed at the straight shaped outer periphery of the outer side radial bearing 19. Three passages 31 are arranged respectively with an equal pitch.

Figure 4:
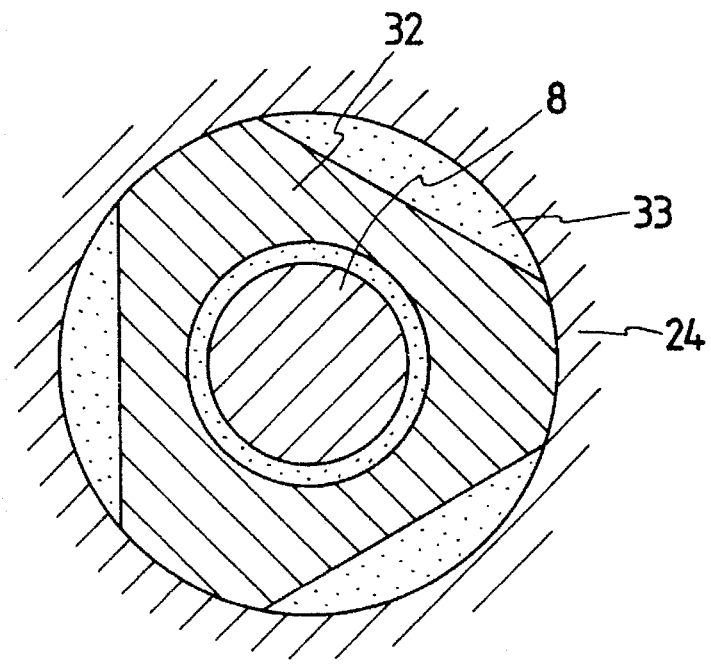
FIG. 4 is a lateral cross-sectional view of a flow rectifying plate of the polygon mirror motor shown in FIG. 1.

A substantially triangular shaped flow rectifying plate 32 is placed remotely a little distance from an end face of the outer side of the inner side radial bearing 18, as shown in FIG. 4. This flow rectifying plate 32 is installed by sandwiching the fitting projecting member 27 of the inner side bearing supporting portion 16 and the cap base body 24.

Communicating holes 33 are formed on the outer periphery of the flow rectifying plate 32, as shown in FIG. 4. These communicating holes 33 are arranged with an equal pitch, respectively. The flow rectifying plate 32 is sandwiched by the fitting projecting member 27 and the cap base body 24 except for the portion occupied by the communicating holes 33.

A space 34 is formed at a side of the outer side end face of the inner side radial bearing 18. The flow rectifying plate 32 divides the space 34 by partitioning or separating the space 34. The space 34 is formed by the inner peripheral face of the cap base body 24, the inner peripheral face of the screw type viscous seal 25 and the outer side end face of the inner side radial bearing 18.

The dimension d of a clearance between the outer side end face of the inner side radial bearing 18 and the flow rectifying plate 32 is about 0.5 mm. The dimension b of a clearance between an end face of an inner part of the inner side radial bearing 18 and an inner part of the inner side bearing chamber 20 is about 1 mm.

Further, the dimension a of a clearance between the inner periphery of the bearing fluid communicating passage 22 and the outer periphery of the rotative shaft 8 is less than 1/20 of the outer diameter dimension D of the rotative shaft 8. The outer diameter dimension D of the rotative shaft 8 is about 5 mm.

The outer side end portion of the outer side bearing chamber 21 for holding the outer side radial bearing 19 is closed by a lid 35. This lid 35 is installed by fitting it into a dent portion for the lid 35. This recess porion for the lid 35 is formed in the outer side end portion of the outer side bearing supporting portion 17.

The fitting between the lid 35 and the lid recess portion is carried out by sealing it fully to a joining face with an air-tight condition. The dimension c of a clearance between the outer side end portion of the outer side radial bearing 19 and the lid 35 is about 0.5 mm. The dimension b of a clearance between the inner side end portion of the outer side radial bearing 19 and an inner part of the outer side bearing chamber 21 is about 1 mm.

The outer side radial bearing 19 has an oil supply groove and an outer peripheral passage similar to the inner side radial bearing 18. Further, each of the outer side radial bearing 19 and the inner side radial bearing 18 has a chamfer portion.

The magnetic thrust bearing is provided so as to straddle the motor base body 1 and the rotary body 3. This magnetic thrust bearing is comprised of a stator side permanent magnet 36 and a rotor side permanent magnet 37.

The stator side permanent magnet 36 is provided on a tip end side outer periphery of the inner side bearing supporting portion 16. The rotor side permanent magnet 37 is provided on the rotary body 3 and is positioned to face the stator side permanent magnet 36. A circular shaped recess portion 38 is formed in the rotary stand 6 of the rotary body 3 and is shaped to receive the inner side bearing supporting portion 16.

The rotor side permanent magnet 37 is installed in an inner periphery of the circular shaped recess portion 38. The stator side permanent magnet 36 and the rotor side permanent magnet 37 are formed respectively in a ring shaped form. In the surfaces of the stator side permanent magnet 36 and the rotor side permanent magnet 37 which face toward the radial direction, the different poles are arranged to face each other.

In a polygon mirror motor having the above stated structure, the rotary body 3 is installed on the motor base body 1 of the stator using the following method.

Before the installation of the rotary body 3, the magnetic seal 26 for sealing the magnetic fluid provides a vertically extending opening at the central portion thereof. The motor base body 1 is set up as shown in FIG. 1, and after that, a predetermined amount magnetic fluid serving as the lubricating oil is poured through the opening of the magnetic seal 26.

After that, the rotative shaft 8 is inserted into the motor base body 1 through the opening of the magnetic seal 26, thereby the rotary body 3 is installed on the motor base body 1.

The tip end of the inner side of the rotative shaft 8 is so as to float a little distance from the inner face of the lid 35. The reason why the rotary body 3 is maintained at a predetermined position is due to the magnetic thrust bearing structure.

When the rotative shaft 3 is inserted into the inner side radial bearing 18, the outer side radial bearing 19 and the bearing communicating passage 22, the oil face of the magnetic fluid rises to the installing position of the flow rectifying plate 32, thereby both the inner side radial bearing 18 and the outer side radial bearing 19 are immersed in the magnetic fluid.

The magnetic fluid is shown using dots in figures. This magnetic fluid is lubricating oil and which flows through and fills the bearing clearances. The bearing clearances are formed by the inner side radial bearing 18 and the outer side radial bearing 19, respectively.

This magnetic fluid contains ferrite powders therein. The dimension of the ferrite powders is 0.01 μm–0.015 μm and the ferrite powders are performed through the surface active agent. Since the dimension of the bearing clearance is 5 μm–10 μm, the lubricating oil of the magnetic fluid can flow fully into the bearing clearance.

The rotative shaft 8 is supported rotatively by the inner side radial bearing 18 and the outer side radial bearing 19. The inner side tip end of the rotative shaft 8 is positioned within the outer side radial bearing 19 and another end of the rotative shaft 8 penetrates through the inner side radial bearing 18 and extends to the outside portion.

Accordingly, the magnetic fluid is restrained from leaking to the outside portion by the magnetic seal 26 for sealing the magnetic fluid and the spiral shaped form groove 29.

Next, the operation of the above embodiment of the present invention will be explained.

In response to the electric power to the motor, the rotary body 3 having the rotor 6 rotates. The lubricating oil is received in the clearance formed between the inner periphery of the bearing fluid communicating passage 22 and the outer periphery of the rotative shaft 8. This lubricating oil is swirled at the same horizontal oil level (surface) accompanying the rotation of the rotative shaft 8.

Due to this swirl flow, it was confirmed that air bubbles and air voids are produced in the lubricating oil within the clearance of the bearing fluid communicating passage 22. Further, it was confirmed that the phenomena of air bubbles and air voids being generated appeared more remarkably for a wider clearance of the bearing fluid communicating passage 22 and at a speed of rotation of the rotative shaft 8 of more than 15,000 rpm.

Besides, it appears that, in the installation process of the motor, during the process for inserting the shaft 8 into the inner side radial bearing 18 and the outer side radial bearing 19, fine air which is mixed into the lubricating oil, the air particles originally contained in the lubricating oil and/or the residual air which remains in the motor after the above stated installation process of the motor grow to the size of air bubbles and air voids due to the above stated swirl flow.

Then, when the air bubbles or the air voids are generated, the friction fluctuation occurs in the clearance of the bearing fluid communicating passage 22 and a rotation number fluctuation is produced on the rotary body 3.

Further, the air bubbles or the air voids move from the clearance of the bearing fluid communicating passage 22 toward the side of the inner side radial bearing 18 and to the side of the outer side radial bearing 19 and they flow into the bearing clearances of the inner side radial bearing 18 and the outer side radial bearing 19.

In the above case, the viscosity of the lubricating oil is changed and the sliding resistance of the bearing clearances is changed, resulting in the rotation number fluctuation of the rotary body 3.

The inventors of the present invention have studied in detail the generation of the air bubbles or the air voids, and as a result they found that the generation condition changes in response to variation of the dimension of the clearance of the bearing fluid communicating passage 22.

Namely, they found out that, when the clearance of the bearing fluid communicating passage 22 is made narrower, there is a tendency for smaller generation of bubbles and voids. In the prior art bearing apparatus, the clearance of the bearing fluid communicating passage was wide, being at least 1/10 of the outer diameter of the rotative shaft.

However, it was confirmed that when the clearance of the bearing fluid communicating passage 22 is formed so as to be less than 1/20 of the outer diameter of the rotative shaft 8, the generation of the air bubbles or the air voids almost never occurs.

As stated above, when the dimension a of the clearance of the bearing fluid communicating passage 22 is made to be less than 1/20 of the outer diameter of the rotative shaft 8, the generation of the air bubbles or the air voids can be restrained and the rotation number fluctuation of the rotary body 3 can be checked.

Next, the inventors found out that by changing the clearance dimension formed between the outer side end face of the bearing fluid communicating passage 22 and the lid 35, the generation of the air bubbles or the air voids is changed.

Namely, there is a tendency that, when the clearance formed between the outer side end face of the bearing fluid communicating passage 22 and the lid 35 is wide, the generation of air bubbles or air voids is significant.

However, when the clearance formed between the outer side end face of the bearing fluid communicating passage 22 and the lid 35 is narrow, the generation of air bubbles or air voids is restrained.

When the clearance formed between the outer side end face of the bearing fluid communicating passage 22 and the lid 35 is wide, the pressure of the central portion of the outer side end face of the rotative shaft 8 decreases and a secondary flow is generated in the lubricating oil. For the above stated reasons, fine air bubbles are gathered at the central portion of the outer side end face of the rotative shaft 8 and the gathered air bubbles grow to have some degree of largeness.

These large size air bubbles are projected toward a side of the outer periphery of the outer side bearing chamber 21 and are made minute, a part of the air bubbles flows into the bearing clearance of the outer side radial bearing 19 and it causes a fluctuation of the rotation number of the rotary body 3.

Herein, if the clearance dimension of the outer side radial bearing 19 is wide, such as 1 mm degree, the generation of the air bubbles was seen, and when the clearance dimension of the outer side radial bearing 19 is 0.5 mm degree, the above stated secondary flow is mitigated, thereby the generation of the air bubbles at the outer side end face of the rotative shaft 8 is substantially eliminated.

Further, in the outer side radial bearing 19, the circulating flow of the lubricating oil as shown by the arrow in FIG. 2 is generated. Namely, the lubricating oil ascends from a passage which is positioned at the side of the outer periphery of the outer side radial bearing 19, and further the ascending lubricating oil creates a circulating flow in which the lubricating oil moistens the bearing clearance and descends.

When the clearance dimension b is 1 mm, and the relationship between the clearance dimensions c and b is made so that c≦b, the air bubble inflow into the bearing clearance of the outer side radial bearing 19 can be reduced remarkably.

Next, the operation relating to the flow of the lubricating oil at the side of the inner side radial bearing 18 will be explained. As shown by the arrow in FIG. 2, the lubricating oil circulates around the inner side radial bearing 18.

The lubricating oil ascends the passages 31 which are positioned at the outer periphery side of the inner side radial bearing 18 and the lubricating oil moves toward the central direction or toward the rotative shaft 8 of the outer periphery side of the inner side radial bearing 18 and moistens the bearing clearance of the inner side radial bearing 18 and descends, thereby a circulating flow is formed.

The lubricating oil circulates as stated above, however since the flow rectifying plate 32 is provided at a side of the outer side end face, no air bubbles flow into the bearing clearance.

Namely, in a case in which the flow rectifying plate 32 is not provided, due to the rotation of the rotative shaft 8, a swirling flow is generated at a side of the outer side face end of the inner side radial bearing 18. Such a swirling flow disturbs the oil surface (oil level) of the lubricating oil and makes a downward curved oil surface directed toward the rotative shaft 8. The air is caught by the swirling flow of the oil surface and air bubbles are generated.

However, by the provision of the flow rectifying plate 32, since the swirling flow for disturbing the oil surface is restrained and the entrainment of the air does not occur, air bubbles are not generated in the lubricating oil. As a result, the oil film passing through the bearing clearance of the inner side radial bearing 18 is not cut-off due to air bubbles, thereby the rotation number fluctuation of the rotary body 3 is not generated.

At a side of the outer periphery of the flow rectifying plate 32, the communicating holes 33 are formed. The space 34 is formed above the flow rectifying plate 32.

These communicating holes 33 can allow the air bubbles which are contained in the ascending circulating flow from the passages 31, which are formed in the outer side of the inner side radial bearing 18, to escape to the space 34. Accordingly, no air bubbles carried in the circulating flow reach the bearing clearance of the inner side radial bearing 18.

In a case in which the above stated clearance dimension a is less than $1/20$ of the outer diameter of the rotative shaft 8, there is originally no generation of the air bubbles, and it is unnecessary for the air bubbles which are contained in the ascending circulating flow from the passages 31 to escape, however, for an accident condition the communicating holes 33 are provided.

Further, a clearance is provided between the flow rectifying plate 32 and the outer side end flat face of the inner side radial bearing 18, however the angle portion of the bearing face of the inner side radial bearing 18 is cut-off and is chamfered, so that even if the flow rectifying plate 32 were to contact the outer side end flat face of the inner side radial bearing 18, a similar function and effect can be obtained.

Further, when the clearance dimension b of the inner side radial bearing 18 is 1 mm degree and the dimension relationship is $d \leq b$, the flow of the air bubbles into the bearing clearance of the inner side radial bearing 18 can be reduced.

As stated above, since consideration is given to the restraint of the air bubble generation and the air bubble approach prevention to the bearing clearances, a reduced rotation number fluctuation at a high speed of 30,000 rpm at less than 10/1000% over a long cycle period or less than 5/1000% over a short cycle period can be obtained.

The above stated one embodiment involves a structure in which the motor is arranged lengthwise, however a similar effect can be expected from a structure in which the motor is arranged laterally.

According to the present invention, since a rotary body bearing apparatus comprises a bearing supporting member, a radial bearing member, a bearing chamber formed in the bearing supporting member for holding the radial bearing member, a rotative shaft supported rotatively by the radial bearing member with lubricating oil filling a bearing clearance between the rotative shaft and the radial bearing member, and an air bubble restraint means for restraining the occurrence of air bubbles generated in the lubricating oil by the rotation of the rotative shaft, air bubbles are not generated in the lubricating oil, and a rotary body apparatus and/or a motor having an extremely small rotation number fluctuation can be obtained.

We claim:

1. A rotary body bearing apparatus comprising:

a bearing supporting member;

a radial bearing member;

a bearing chamber formed in said bearing supporting member for holding said radial bearing member;

a rotative shaft supported rotatively by said radial bearing member with a bearing clearance for the flow of lubricating oil being formed between said rotative shaft and said radial bearing member; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

2. A rotary body bearing apparatus comprising:

a bearing supporting member;

a radial bearing member;

a bearing chamber formed in said bearing supporting member and for holding said radial bearing member;

a rotative shaft supported rotatively by said radial bearing member with a bearing clearance for the flow of lubricating oil being formed between said rotative shaft and said radial bearing member;

a space formed at a side of an outer side end portion of said radial bearing member; and a flow rectifying member arranged in said space at an interval from said side of said outer side end portion of said radial bearing member.

3. A rotary body bearing apparatus comprising:

a bearing supporting member;

a radial bearing member;

a bearing chamber formed in said bearing supporting member for holding said radial bearing member;

a rotative shaft supported rotatively by said radial bearing member with a bearing clearance for the flow of lubricating oil being formed between said rotative shaft and said radial bearing member;

a clearance formed between an inner part of said radial bearing member and an inner part of said bearing chamber;

a passage formed at a side of an outer periphery of said radial bearing member;

a space formed at a side of an outer side end portion of said radial bearing member; and a flow rectifying member arranged in said space at an interval from said side of said outer side end portion of said radial bearing member.

4. A rotary body bearing apparatus comprising:

a bearing supporting member;

a radial bearing member;

a bearing chamber formed in said bearing supporting member and for holding said radial bearing member;

a rotative shaft supported rotatively by said radial bearing member with a bearing clearance for the flow of magnetic fluid as a lubricating oil being formed between said rotative shaft and said radial bearing member;

a magnetic seal for sealing said magnetic fluid provided on a side of an outer side end portion of said radial bearing member and for surrounding completely an outer periphery of said rotative shaft; and air bubble restraint means for restraining the generation of air bubbles in said magnetic fluid by the rotation of said rotative shaft and for restricting the flow of said lubricating oil in a clearance which is formed by members disposed at outer side end portions of said radial bearing member.

5. A rotary body bearing apparatus comprising:

a bearing supporting member;

a radial bearing member;

a bearing chamber formed said bearing supporting member and for holding said radial bearing member;

a rotative shaft supported rotatively by said radial bearing member with a bearing clearance for the flow of magnetic fluid as a lubricating oil being formed between said rotative shaft and said radial bearing member;

a space formed at a side of an outer side end portion of said radial bearing member;

a flow rectifying member arranged at an interval from said side of said outer side end portion of said radial bearing member; and a magnetic seal for sealing said magnetic fluid for surrounding completely an outer periphery of said rotative shaft and for enclosing said space.

6. A rotary body bearing apparatus comprising:

a bearing supporting member;

two radial bearing members;

two bearing chambers formed separately from each other in said bearing supporting member so as to hold said two radial bearing members;

a rotative shaft supported rotatively by said two radial bearing members with a bearing clearance for the flow of lubricating oil being formed between said rotative shaft and each of said two radial bearing members;

a fluid communicating passage for said two radial bearing members being formed between said bearing chambers so as to connect said two bearing chambers, said fluid communicating passage for said bearing member being filled with said lubricating oil; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

7. A rotary body bearing apparatus comprising:

a bearing supporting member;

two radial bearing members;

two bearing chambers formed separately from each other in said bearing supporting member so as to hold said two radial bearing members;

a rotative shaft supported rotatively by said two radial bearing members with a bearing clearance for the flow of lubricating oil being formed between said rotative shaft and said two radial bearing members;

a fluid communicating passage for said two radial bearing members being formed between said bearing chambers so as to connect said two bearing chambers, said fluid communicating hole for said bearing member having said rotative shaft passing therethrough with a clearance which is filled with said lubricating oil; and the dimension of said clearance formed between an inner periphery of said fluid communicating passage and an outer periphery of said rotative shaft being set less than 1/20 of the diameter of said rotative shaft.

8. A rotary body bearing apparatus comprising:

a bearing supporting stand;

two bearing supporting members provided separately from said bearing supporting stand;

two bearing chambers formed respectively on said two bearing supporting members;

two radial bearing members held respectively in said two bearing chambers;

a respective member provided on an outer side end portion of each of said two radial bearing members;

a rotative shaft supported rotatively by said two radial bearing members with a bearing clearance for the flow of magnetic fluid as a lubricating oil being formed between said rotative shaft and said two radial bearing members;

a fluid communicating passage for said bearing member being formed in said bearing supporting stand for connecting said two bearing chambers which are arranged separately;

one of the end portions of said rotative shaft being disposed so as not to extend from one of said bearing chambers and the other one of said end portions of said rotative shaft extending from the other of said bearing chambers through one of said members provided on an outer side end portion of said radial bearing members, said bearing chamber from which said one end of said rotative shaft does not extend being enclosed by the other of said members provided on an outer side end portion of said radial bearing members at a side toward which said end portion of said rotative shaft face;

a magnetic seal for sealing said magnetic fluid by surrounding completely an outer periphery of said rotative shaft and enclosing said bearing chamber through which said rotative shaft penetrates;

said fluid communicating passage for said bearing member formed in said bearing supporting stand so as to connect said two bearing chambers having said rotative shaft passing therethrough with a clearance;

said radial bearing member held by the one of said bearing chambers from which an end portion of said rotative shaft does not extend being arranged to form respective clearances with an inner part side of said one bearing chamber and an enclosing side of said one bearing member, the clearance formed at said enclosing side of said one bearing member being narrower than the clearance formed at said inner part side of said one bearing chamber, and a passage for connecting said clearance formed at said enclosing side of said bearing member and said clearance formed at said inner part side of said one bearing chamber being narrower than the clearance formed at said inner part side of said one bearing chamber and being formed at an outer periphery of said one bearing chamber;

said radial bearing member held by said other bearing chamber form which said rotative shaft extends being arranged to form a clearance at an inner part side of said other bearing member, and a passage is formed to connect said clearance and an outer side end portion of said other radial bearing member along an outer periphery of said other radial bearing member; and the dimension of a clearance formed between an inner periphery of said fluid communicating passage and an outer periphery of said rotative shaft being set to less than 1/20 of the dimension of the outer diameter of said rotative shaft.

9. A motor comprising:

a motor base body;

a rotary body;

a stator coil provided on said motor base body;

a bearing supporting member provided on said motor base body;

a rotor magnet provided on said rotary body;

a bearing chamber formed in said bearing supporting member;

a radial bearing member held on said bearing chamber;

a rotative shaft supported rotatively by said radial bearing member with a bearing clearance for the flow of lubricating oil being formed between said rotative shaft and said radial bearing member at said radial bearing member, said rotary body being fixed on said rotative shaft; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

10. A motor according to claim 9, wherein a magnetic thrust bearing member is provided so as to straddle said motor base body and said rotary body.

11. A motor according to claim 9, wherein a stator permanent magnet is provided on said motor base body;

a rotor permanent magnet is provided on said rotary body; and said stator permanent magnet and said rotor permanent magnet are arranged oppositely in a radial direction.

12. A motor comprising:

a motor base body;

a rotary body;

a stator coil provided on said motor base body;

a bearing supporting member provided at a central portion of said motor base body;

a flange portion formed with a flange shaped form at an outer periphery of said bearing supporting member;

a bearing chamber formed in said bearing supporting member;

a radial bearing member held in said bearing chamber;

a rotative shaft supported rotatively by said radial bearing member with a clearance for the flow of lubricating oil being formed between said rotative shaft and said radial bearing member at said radial member, said rotative shaft having said rotary body fixed thereto;

a flat shaped form stator coil arranged on said flange portion;

a rotor magnet provided on said rotative shaft and arranged to face an axial direction of said rotative shaft; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

13. A polygon mirror motor comprising:

a motor base body;

a rotary body;

a stator coil provided on said motor base body;

a bearing supporting member provided on said motor base body;

a polygon mirror provided on said rotary body;

a rotor magnet provided on said rotary body;

a bearing chamber formed in said bearing supporting member;

a radial bearing member held in said bearing chamber;

a rotative shaft supported rotatively said radial bearing member and for fixing said rotary body with a bearing clearance for the flow of lubricating oil being formed between said rotative shaft and said radial bearing member at said radial bearing member, said rotating body being fixed to said rotative shaft; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

14. A polygon mirror motor according to claim 13, wherein a magnetic thrust bearing is provided so as to straddle said motor base body and said rotary body.

15. A polygon mirror motor according to claim 13, wherein a stator permanent magnet is provided on said motor base body;

a rotor permanent magnet is provided on said rotary body; and said stator permanent magnet and said rotor permanent magnet are arranged oppositely in a radial direction.

16. A polygon mirror motor comprising:

a motor base body;

a rotary body;

a stator coil provided on said motor base body;

a bearing supporting member provided on said motor base body; a rotary stand provided on said rotary body;

a polygon mirror provided on said rotary stand;

a bearing chamber formed in said bearing supporting member;

a radial bearing member held in said bearing chamber;

a rotative shaft supported rotatively said radial bearing member with a bearing clearance for the flow of lubricating oil being formed between said rotative shaft and said radial bearing member at said radial bearing member, said rotary body being fixed to said rotative shaft; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

17. A polygon mirror motor comprising:

a motor base body;

a rotary body;

a bearing supporting member provided at a central portion of said motor base body;

a flange portion formed a flange shape at an outer periphery of said bearing supporting member;

a bearing chamber formed in said bearing supporting member;

a radial bearing member held in said bearing chamber;

a polygon mirror provided on said rotor;

a rotative shaft supported rotatively by said radial bearing member with a clearance for the flow of lubricating oil being formed between said rotative shaft and said radial bearing member at said radial member, said rotative shaft having said rotary body fixed thereto;

a flat shaped form stator coil arranged on said flange portion;

a rotary stand provided on said rotary body;

a polygon mirror provided on said rotary stand;

a rotor magnet provided on said rotary stand and said rotor magnet being arranged to face said stator coil in an axial direction of said rotative shaft; and air bubble restraint means for restraining the generation of air bubbles in said lubricating oil caused by the rotation of said rotative shaft and for restricting the flow of said lubricating oil in a clearance which is formed by members disposed at outer side end portions of said radial bearing member.

* * * * *